United States Patent
Stuemky

(10) Patent No.: US 6,170,885 B1
(45) Date of Patent: *Jan. 9, 2001

(54) SELF-ADJUSTING AT-LEAST-TWICE-ORIENTED POLYMER HOSE AND TUBING CLAMP

(75) Inventor: Robert E. Stuemky, Franktown, CO (US)

(73) Assignee: The Gates Corporation, Denver, CO (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/728,464

(22) Filed: Oct. 10, 1996

(51) Int. Cl.⁷ .................................................. F16L 33/207
(52) U.S. Cl. ........................ 285/242; 285/381.4; 285/909; 285/906; 156/86
(58) Field of Search .................. 285/381.4, 381.5, 285/242, 909, 906; 428/34.9, 35.1, 345; 156/86

(56) References Cited

U.S. PATENT DOCUMENTS

| 3,315,986 | 4/1967 | Quick . |
| 3,975,039 | 8/1976 | Penneck et al. . |
| 4,027,406 | * 6/1977 | Salvatore ................................. 36/83 |
| 4,413,028 | * 11/1983 | Diaz ..................................... 428/35.1 |
| 4,650,228 | 3/1987 | McMills et al. . |
| 4,874,665 | * 10/1989 | Doheny ................................ 428/345 |
| 5,169,176 | 12/1992 | Brossard . |
| 5,340,167 | 8/1994 | Morse . |

FOREIGN PATENT DOCUMENTS

| 0253712 | 1/1988 | (EP) . |
| 0388764 | 9/1990 | (EP) . |
| 8604542 | 8/1986 | (WO) . |

* cited by examiner

Primary Examiner—Dave W. Arola
(74) Attorney, Agent, or Firm—S. G. Austin, Esq.; C. H. Castleman, Esq.; J. A. Thurnau, Esq.

(57) ABSTRACT

The invention is a device for providing a clamping force about a connection end of elastomeric hose or tubing. The device includes an at-least-twice-oriented polymer having a shrinkage response to each of at least two diameter reducing release temperatures, which is sized and formed into a band. The clamp is self-adjusting over a substantial working life. The band may be installed onto connection ends of hose or tubing and fixtures such as couplings, inserts or stems without the external application of heat, preferably preselecting the first diameter reducing release temperature to be at roughly room temperature. The clamp displays improved constrictive forces over prior art polymer clamps.

34 Claims, 2 Drawing Sheets

SELF-ADJUSTING AT-LEAST-TWICE-ORIENTED POLYMER HOSE AND TUBING CLAMP

BACKGROUND OF THE INVENTION

The present invention relates generally to the clamping of elastomeric hose and tubing to fixtures and hose coupling devices, such as stems and coupling inserts, and to the use of bands formed from an at-least-twice-oriented polymer having a shrinkage response to each of at least two diameter reducing release temperatures, to provide improved constrictive forces about elastomeric hose and tubing. More particularly, this invention relates to an improved elastomeric hose and tubing clamp formed from a band of an at-least-twice-oriented polymer, which is simpler to install than prior art clamps. Specifically, this invention relates to an improved clamp for sealing hose and tubing to coupling devices associated with automotive coolant systems.

Reinforced elastomeric hose and tubing, hereinafter generically referred to as hose, are commonly used to convey various fluids which may be under a variety of pressures and temperatures as part of fluid transport systems. For these systems to operate effectively, the connections between the hose and the stems, couplings or other fixtures must be fluid tight and must be able to resist separations caused by fluid pressure. This mode of separation is known as blow-off. Separation of the hose from the fixtures may also occur as a result of environmental interference, which mode of separation is known as pull-off.

Connections between hose and couplings or other fixtures are commonly made by placing the open end of a hose over e.g., a stem. The hose and the associated fixture are ordinarily sized and shaped to allow the open end of the hose to slip over the fixture, and to securely seat about same. In moderate temperature or pressure environments such a fit is generally sufficient. More typically however, a hose clamp is applied about the hose near the open end thereof for urging the hose more tightly about the stem or insert in order to resist leakage, blow-off and pull-off.

Hose clamps have been produced in various sizes and shapes, and have been made of various materials. A number of prior art hose clamp designs, along with summaries of their respective deficiencies, are described in U.S. Pat. No. 5,340,167. Common deficiencies of prior art hose clamps include the corrosion of metal clamps, the danger of hose damage due to sharp metal edges, clamp protrusions necessitating specific axial and circumferential placement of the clamp and occupying valuable space in the hose environment, and the difficulty in utilizing rapid automated assembly line-type installation techniques with these clamps. Additionally, most prior art hose clamps have insufficient self-adjustment characteristics, that is, an inability to expand and contract to follow the expansion and contraction of the clamped materials.

The most prevalent and persistent problem affecting prior art hose clamps in modern automotive coolant systems is an inability to resist cold leaks over time. Cold leakage generally occurs when the coolant system is cold. While such leaks in older systems are more common, new systems are not immune to the problem. Cold leakage results from the combined effects of the compression set of the hose material and the contraction of the hose as temperatures drop. The compressive force exerted by the hose clamp combined with the exposure to high temperature over time provided by the flow of coolant as it cycles through the system cause the hose material to flow away from the clamped site. This phenomenon is a consequence of the compression set of the hose material. As the coolant system further cycles and coolant flows away from the clamped area, exposing this area to relatively cold temperatures, the now thinner hose segment in the area of the clamp slips away from the clamp, effectively breaking the seal and resulting in a cold leak.

Cold leakage is exacerbated when the hose clamp employed exerts a non-uniform constrictive force about the circumference of the hose, whereby separation between the stem and the hose occurs, again breaking the seal and resulting in leakage. Such non-uniformity can furthermore lead to leakage at times other than when the system is cold. Generally, the discontinuities found in many prior art hose clamps rendered such clamps highly susceptible to cold leakage.

For purposes of the present disclosure, the term "dynamic hoop stress" will be used to signify the constrictive force per unit area a hose clamp exerts upon the clamped object as a result of the inner diameter of the clamp being actively reduced. The term, "static hoop stress" will be used to signify the constrictive force per unit area the clamp exerts upon the clamped object in countering an expansive force exerted by the clamped object. This is typically attributable to the fluid pressure present during fluid transfer, and also includes the effect of the thermal expansion of the elastomeric hose about which the band is clamped. The dynamic and static hoop stresses required of a particular clamp depend upon the application requirements.

An improvement in hose clamp design over traditional forms is the subject of the aforementioned U.S. Pat. No. 5,340,167, and involves a heat shrinkable polymer band having a single diameter reducing release temperature, which may be placed over an elastomeric hose and stem or other coupling device. The application of this clamp generally involves placing the clamp loosely about the hose at its connection end, placing the connection end about the stem or insert, and then heating the clamp to a predesignated temperature at which point shrinkage occurs. The point at which shrinkage occurs is referred to as the diameter reducing release temperature. The temperature is maintained at or about the release temperature at least until the clamp shrinks down to fit securely about the connection end. As the material of the polymeric clamp is fairly flexible and the shape of the clamp is without significant discontinuities, it can be seen that the constrictive force applied by the clamp is substantially uniform.

The heat shrinkable polymer hose clamp offers significantly improved self-adjustment characteristics and excellent dynamic and static hoop stresses for improved resistance to blow-off and pull-off compared to other more traditional styles of hose clamp, and it is furthermore devoid of projections which otherwise waste space, require specific axial or rotational positioning, and are a source of injury or the collection of debris. This type of clamp also conforms well to irregularities in stem and insert shapes. Installation of the clamp however, requires the relatively cumbersome and awkward use of a heat source at the installation site to induce engagement of the clamp with the hose connection end. This is especially difficult in assembly-line type environments where different types of hose connection systems may be installed on automotive equipment. For example, hose connection systems may be configured in a variety of directions, e.g., horizontally and vertically; they may come in an array of diameters; they may be located in relatively confined, tight areas surrounded by other equipment. In addition, heat must be applied for a period of time sufficient for proper engagement of the clamp and the hose; this may require from several seconds to several minutes depending on the clamp size and location, which operation is time-consuming and generally impractical in assembly line settings. One also may be required locate additional power sources along the assembly lines to accommodate the use of heat sources.

Satisfactory application of the heat shrinkable band is moreover highly sensitive to operator error; if heat is not applied uniformly, the band may not fit correctly, resulting in increased potential for leakage. To ensure uniform heat distribution, the use of a device or heat monitor may be required. Likewise, if the clamp is not applied in the correct position, perfect heat distribution may not compensate for misfit which also increases the possibility of leakage. A hose clamp that is self-adjusting, is capable of exhibiting a uniform constrictive force about the connection end of hose, is capable of improved dynamic and static hoop stresses, and which may be applied to hose connection ends easily and without the external application of heat has not heretofore been known.

SUMMARY OF THE INVENTION

Accordingly, it is one object of the present invention to provide a hose clamp which is capable of being rapidly installed about the connection ends of hose and tubing without the need for the application of heat to the clamp.

It is a further object of the present invention to provide a hose clamp which exhibits improved constrictive forces, in terms of dynamic hoop stress, about the connection points of hose.

To achieve the foregoing and other objects and in accordance with a purpose of the present invention as embodied and broadly described herein, a self-adjusting, at-least-twice-oriented polymer hose clamp and method for application thereof is provided. The hose clamp of the present invention provides a clamping force about a connection end of elastomeric hose. The device includes an at-least-twice-oriented polymer band exhibiting a shrinkage response to each of at least two temperature reducing release temperatures, which polymer is formed into a band or clamp.

BRIEF DESCRIPTION OF THE DRAWINGS

The accompanying drawings which are incorporated in and form a part of the specification, illustrate preferred embodiments of the invention, and together with a description, serve to explain the principles of the invention. In the drawings.

DESCRIPTION OF THE PREFERRED EMBODIMENTS

Figure 1:
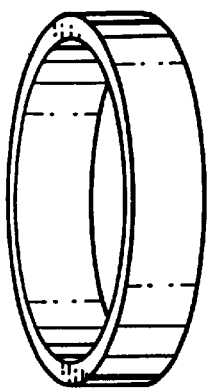
FIG. 1 is a perspective view of another prior art hose and tubing clamp.

Referring to the drawings and particularly to FIG. 1 there is an example of an existing hose clamp, i.e., a heat-shrinkable hose and tubing clamp, the disadvantages of which, in terms of greater constrictive force and ease of effective installation over the connection ends of hose and tubing, the present invention is seen to be an improvement upon.

Figure 2:
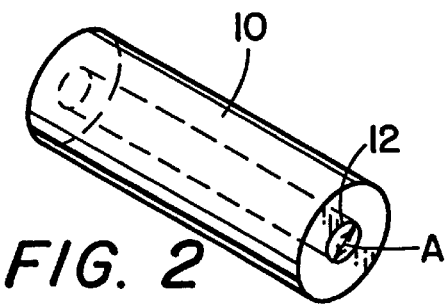
FIG. 2 is a perspective view of a preferred embodiment of the present invention prior to first polymer orientation of the clamp.

Referring to FIG. 2, there is shown a preferred embodiment of the present invention in the form of a self-adjusting at-least-twice-oriented polymer hose and tubing clamp 10 in its non-oriented or pre-expanded state. What is meant by the term, "at-least-twice-oriented polymer" in this context is a polymer which has been oriented, i.e., mechanically expanded at least twice to result in a polymer which exhibits a shrinkage response to each of at least two diameter reducing release temperatures.

The inside diameter A of the clamp 10 at this point is defined as its first nominal inside diameter. This diameter is generally smaller than the outside diameter of the connection end of the hose about which the clamp is to be applied. The clamp 10 may be formed by first extruding a tube of the clamp material with a bore 12, and cutting it to length as shown. In a preferred embodiment, the clamp is designed such that the ratio of the outside diameter of the hose about which the clamp will be placed, to the clamp's first nominal inside diameter is from about 2.5:1.0 to about 5.0:1.0, more preferably from about 3.0:1.0 to about 4.8:1.0, and is most preferably from about 3.5:1.0 to about 4.5:1.0.

The lower modulus of the clamp material useful in the practice of the present invention compared to metal hose clamps of the prior art allows greater widths to be utilized; the clamp may extend over the bead of the stem without compromising the clamp's seal integrity. The homogeneity of the clamp material and continuity of the clamp design allow for greater clamp thicknesses. In metal hose clamps of the prior art, such thicknesses would generally result in leak paths. For example, a hose clamp of the present invention designed for use with a conventional 2.5 inch (6.4 cm.) inside diameter elastomer hose will have a width of from approximately 1.20 inches (3.05 cm.) to approximately 1.40 inches (3.56 cm.) and a thickness of from approximately 0.080 inches (0.20 cm.) to about 0.100 inches (0.25 cm). In a further example, a hose clamp of the present invention designed for use with a conventional 0.75 inch (1.91 cm.) inner diameter hose will have a width of from approximately 0.75 inches (1.90 cm) to about 0.94 inches (2.39 cm) and a thickness of from approximately 0.060 inches (0.15 cm) to about 0.080 inches (0.20cm).

Figure 3:
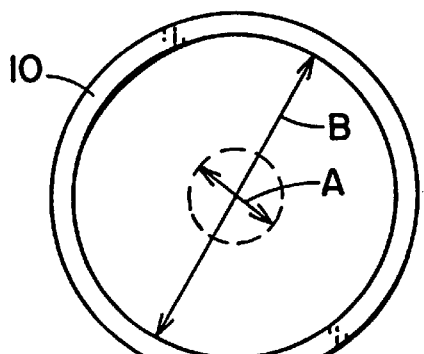
FIG. 3 is an end view of a preferred embodiment of the present invention subsequent to first polymer orientation and prior to second polymer orientation of the polymer material.

Referring again to FIG. 2, the tube is then mechanically expanded for a first time at a preselected temperature, taking on the appearance depicted in FIG. 3 by solid lines. At this juncture, the clamp 10 has an inside diameter B that exists during an interim period after first polymer orientation but before second polymer orientation, which diameter is defined as the second nominal inside diameter. The second nominal inside diameter is generally also smaller than the outside diameter of the hose, but is greater than the clamp's first nominal inside diameter. This first mechanical expansion performs the first polymer orientation, which is the process of mechanically deforming the polymer material so as to generate stress characteristics within the polymer structure that result in a response to one of the two or more diameter reducing release temperatures. The stress release associated with this expansion step is manifested by the polymer material tending to reshape itself toward the shape it occupied prior to the first polymer orientation operation, i.e., to its first nominal inside diameter A, and takes place when the clamp is exposed to temperatures at or near the first mechanical expansion temperature.

In a preferred embodiment, the first mechanical expansion is carried out such that the ratio of the clamp's second nominal inside diameter to its first nominal inside diameter is from about 1.5:1.0 to about 5.0:1.0, more preferably from about 2.5:1.0 to about 4.2:1.0, and is most preferably from about 3.0:1.0 to about 4.0:1.0.

The polymer bands which form the hose clamps of the present invention respond to each of at least two diameter reducing release temperatures which preferably fall within the range of from about −40° C. to about 175° C., exposure of the band to each of which cause the bands to tend to shrink. The diameter reducing release temperatures may be variably preselected. Each diameter reducing release temperature should preferably in such case be selected so that a distinct shrinkage phase occurs for each such temperature. That is, for a given band, each diameter reducing release temperature should preferably be at least about 5° C. different from any other diameter reducing release temperature within the specified range.

When using the polymeric material preferred in the practice of the present invention, each of the mechanical expansion operations is preferably performed at temperatures below the melting points of the hose and stem material, but in any case above approximately −40° C., and preferably above −10° C., to generate the release characteristics useful in the present invention.

In a preferred embodiment relating to automotive coolant systems, the first mechanical expansion is preferably performed in the temperature range of from about 0° C. to about 150° C., more preferably from about 15° C. to about 100° C. and most preferably from about 60° C. to about 85° C. According to this embodiment, this first mechanical expansion operation performed at these relatively high temperatures creates in the clamp its second of at least two diameter reducing release temperatures.

Once the clamp has been mechanically expanded for a first time, it may be temporarily set at its second nominal inside diameter by chilling it sufficiently, i.e., at from about 15° C. to about −40° C., more preferably at from about 10° C. to about −25° C., and most preferably at from about 5° C. to about −20° C. The oriented band may optionally be mounted upon a restraint at this second nominal inside diameter to avoid any contraction that may be encountered. Any suitable material including cardboard is envisioned for such restraint, which may be generally circular in shape and have an outer diameter just smaller than the band's second nominal inside diameter to allow for placement of the band upon the restraint.

Figure 4:
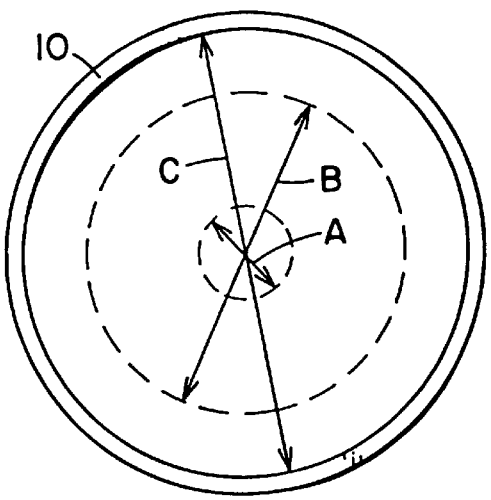
FIG. 4 is an end view of a preferred embodiment of the present invention subsequent to second polymer orientation of the polymer material.

The clamp is then mechanically expanded for a second time at a preselected temperature, taking on the appearance depicted in FIG. 4 by solid lines. Upon completion of this secondary expansion, the clamp 10 has an inside diameter C that exists during an interim period after second polymer orientation yet before either subsequent mechanical expansions, or application to and shrinkage about the connection end of hose. This diameter is defined as the third nominal inside diameter. The third nominal inside diameter is generally greater than the outside diameter of the hose. This second mechanical expansion comprises the second polymer orientation, which repeats the process of mechanically deforming the polymer material so as to generate additional stress characteristics within the polymer structure that result in a response to the second of the two or more diameter reducing release temperatures. The stress release associated with this expansion step is manifested by the polymer material tending to reshape itself toward the shape it occupied prior to the second polymer orientation operation, i.e., to its second nominal inside diameter B, and generally takes place when the clamp is exposed to temperatures at or near the temperature at which the second mechanical expansion took place.

In a preferred embodiment, the second mechanical expansion is carried out such that the ratio of the third nominal inside diameter to the first nominal inside diameter is preferably from about 3.0:1.0 to about 6.0:1.0, more preferably from about 4.0:1.0 to about 5.5:1.0, and is most preferably from about 4.4:1.0 to about 5.2:1.0. When utilizing the polymeric material preferred in the practice of this preferred embodiment of the present invention associated with automotive coolant systems, the second mechanical expansion temperature is preferably in the range of from about 0° C. to about 40° C., more preferably from about 10° C. to about 30° C. and most preferably from about 15° C. to about 25° C. These ranges generally encompass what is commonly referred to as "room temperature". According to this embodiment, this second mechanical expansion operation performed at room temperature creates in the clamp its response characteristic to the first of at least two diameter reducing release temperatures.

Figure 9:
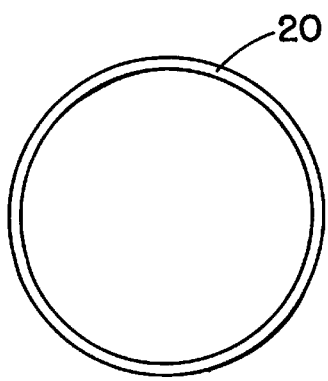
FIG. 9 is a side view depicting one embodiment of a circular restraint useful in the practice of the present invention.

Immediately after the second mechanical expansion operation, as well as after any mechanical expansion operation which is performed at or around room temperature, the at-least-twice-oriented polymer clamp may be mounted upon a generally circular sturdy restraint which resists the forces generated in the clamp which tend to reshape it into its respective pre-orientation diameters. An example of one such sturdy restraint is illustrated in FIG. 9, and comprises a sturdy band having either butted or stitched ends, which is formed into a circle or ring 20. What is meant by the term, "stitched" in this context is a type of finger intertwined- or tongue and groove configuration, wherein each of the otherwise butted end portions of such restraint is characterized by alternating tooth and land portions which are formed to engage similar portions on the opposing end portion. The restraint, whilst requiring sufficient strength to resist buckling via the band's generated compressive forces, must nevertheless be crushable to the extent that it can be buckled or crushed by the application of force from any radial direction by a suitable tool or by hand. This is necessary in order to allow for removal of the band from the restraint at the time of application. The band may be formed from any suitable durable material, including aluminum, steel, reinforced cardboard and wood, and in a preferred embodiment, is made of aluminum. The thickness of the ring will vary depending upon the dimensions of and the constrictive forces exerted by the oriented polymer clamp.

In a preferred embodiment, the sturdy restraint is formed from a quarter hard or half hard slit edge aluminum alloy.

According to this embodiment, and to accommodate at-least-twice-oriented polymer clamps designed for standard hose having inner diameters of from about 0.250 inches (0.64 cm) to about 3.125 inches (7.93 cm), i.e., for restraints having outer diameters of from about 0.60 inches (0.15 cm) to about 4.20 inches (10.7 cm), the restraint preferably has a wall thickness of from about 0.010 inches (0.025 cm) to about 0.050 inches (0.13 cm), more preferably from about 0.015 inches (0.038 cm) to about 0.040 inches (0.10 cm), and most preferably from about 0.020 inches (0.051 cm) to about 0.035 inches (0.089 cm). The restraint preferably has a band width for these design parameters, of from about 0.500 inches (1.27 cm) to about 2.00 inches (5.08 cm), more preferably from about 0.55 inches (1.40 cm) to about 1.75 inches (4.45 cm), and most preferably from about 0.60 inches (1.52 cm) to about 1.60 inches (4.06 cm).

Figure 6:
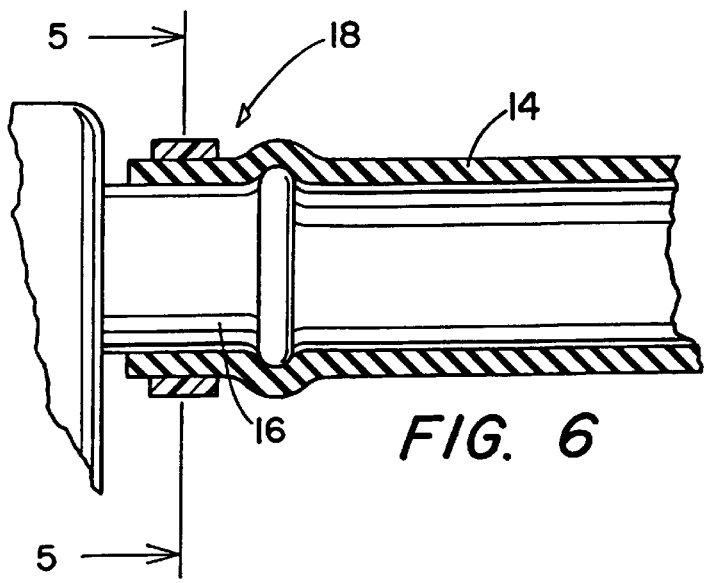
FIG. 6 is a cut-away side view depicting a preferred embodiment of the present invention applied to a hose upon a stem.

Additional mechanical expansion operations may be performed on the at-least-twice-oriented polymer clamp if one seeks to impart in the clamp additional diameter reducing release temperatures. At this point however, the hose clamp 10 may be prepared for placement about the connection end of an elastomeric hose, for clamping the hose 14 to a stem or other hose insert 16, as depicted in FIG. 6. The stem or insert 16 may be associated with any fluid transport system. Such stems and inserts are more preferably associated with systems carrying liquids at temperatures in the range of from about −40° C. through about 175° C. In a preferred embodiment, the stems and inserts are associated with automotive engine coolant systems.

Prior to application of the clamp 10 about hose connection points, chilling of the clamp on the restraint to a temperature of from about 0° C. to about −60° C., preferably from about 5° C. to about −50° C. and most preferably from about −10° C. to about −30° C., while not necessary in the practice of the present invention, is desirable. This is especially the case where the first diameter reducing release temperature is at or near room temperature; chilling the clamp prior to application tends to slow the initial shrinkage phase at room temperature in order to allow a satisfactory amount of time for proper application of the clamp to the connection point of the hose and stem assembly. Notably, such chilling prior to clamp application merely slows, but generally does not prevent shrinkage of the band. Thus, the clamp may begin to shrink substantially below its diameter reducing release temperature, but such shrinkage is at a much slower rate than that shrinkage which occurs when the clamp is exposed to temperatures at or near a preselected diameter reducing release temperature.

Figure 5:
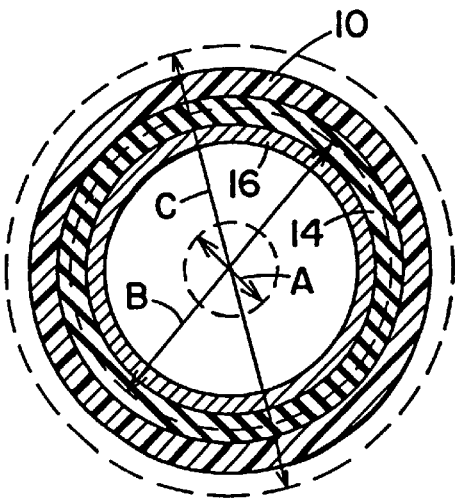
FIG. 5 is an end view of a preferred embodiment illustrating the oriented polymer band after initial shrinkage onto the connection end of hose, taken on the line 5—5 of FIG. 6.

As shown in FIG. 5 and FIG. 6, the application of the clamp 10 to the connection point 18 of a hose and coupling assembly generally involves removing the clamp 10 from the sturdy restraint 20, placing the clamp 10 about the hose 14 at the hose's connection end 18, and placing the connection end 18 about the stem or insert 16. A lubricant may be applied to the hose and/or stem to facilitate application of the clamp. It is contemplated that installation of the at-least-twice-oriented polymer hose clamps will commonly be performed in a room temperature environment. In a preferred embodiment, the second mechanical expansion is performed at room temperature resulting in the clamp's response to the first diameter reducing release temperature. Thus, removal of the sturdy restraint at this first diameter reducing release temperature triggers the initial or first shrinkage i.e., to its second nominal inside diameter B. The clamp is substantially prevented from reaching the second nominal inside diameter however, by the presence of the hose. Instead, the clamp at this point shrinks until reaching an inner diameter defined as its fourth nominal inside diameter. Thus, the clamp's fourth nominal inside diameter is the inner diameter the clamp assumes upon initial shrinkage about the connection end of the hose and stem at the clamp's first diameter reducing release temperature. The clamp's fourth nominal inside diameter is generally smaller than its third nominal inside diameter.

At this point, the clamp is in place about the connection site, and, in a preferred embodiment associated with automotive coolant systems, coolant may now be transferred through the system, generally reaching temperatures of approximately 110° C. According to the preferred embodiment of the present invention, and by preselection of the second diameter reducing release temperature, exposure of the hose clamp to these increased temperatures, albeit through the hose material, triggers the second diameter reducing release characteristic to cause the clamp to tend to further shrink to a point previously defined as the first nominal inside diameter A. Again however, the clamp is substantially prevented from reaching the first nominal inside diameter by the presence of the hose. Instead, the clamp at this point shrinks until reaching an inner diameter defined as its fifth nominal inside diameter. Thus, the clamp's fifth nominal inside diameter is the inner diameter of the clamp upon secondary shrinkage about the connection end of the hose and stem at the clamp's second diameter reducing release temperature.

In the practice of a preferred embodiment of the present invention in the automotive coolant system environment, the first shrinkage phase has been found to be sufficient to generate dynamic hoop stress of about 500 psi ($3.46 \times 10^6$ Pa) in a self-adjusting, at-least-twice-oriented polymer hose clamp designed for a ⅝-inch (1.59 cm) inside diameter hose, which in practice is sufficient for acceptable initial engagement of such clamp about hose connection ends. Thus, the application of heat is unnecessary to bring about sufficient shrinkage to set the clamp in a secure position about the connection end 18 as depicted in FIG. 5. As the material of the clamp 10 is fairly flexible and the shape of the clamp is without significant discontinuities, it can be seen that the constrictive force applied by the clamp 10 at this point is substantially uniform.

Table 1 lists respective nominal inside diameters of several preferred embodiments of the present invention, as well as the inner and outer diameters of the elastomeric hose for which each clamp is optimally designed. In the table, all values are given in inches, and;

ID=inner diameter

OD=outer diameter

D1=first nominal inside diameter

D2=second nominal inside diameter

D3=third nominal inside diameter

TABLE 1

| Hose ID | Hose OD | Clamp D1 | Clamp D2 | Clamp D3 |
|---------|---------|----------|----------|----------|
| 0.250 | 0.560 | 0.197 | 0.462 | 0.669 |
| 0.500 | 0.810 | 0.197 | 0.729 | 0.951 |
| 0.750 | 1.065 | 0.265 | 0.970 | 1.250 |
| 1.000 | 1.340 | 0.321 | 1.232 | 1.573 |
| 1.250 | 1.640 | 0.381 | 1.470 | 1.875 |
| 1.500 | 1.890 | 0.429 | 1.692 | 2.156 |
| 1.750 | 2.140 | 0.476 | 1.914 | 2.440 |
| 2.000 | 2.390 | 0.560 | 2.133 | 2.750 |
| 2.250 | 2.640 | 0.607 | 2.330 | 3.025 |
| 2.500 | 2.890 | 0.655 | 2.520 | 3.313 |

TABLE 1-continued

| Hose ID | Hose OD | Clamp D1 | Clamp D2 | Clamp D3 |
|---------|---------|----------|----------|----------|
| 2.750 | 3.140 | 0.690 | 2.738 | 3.580 |
| 3.000 | 3.390 | 0.771 | 2.947 | 3.886 |

With respect to the hose clamp's first three nominal inside diameters, and in accordance with a further preferred embodiment, the ratio of the third nominal inside diameter of the band to the hose outside diameter, which ratio is hereinafter referred to as the "clearance ratio", is preferably from about 1.0:1.0 to about 1.5:1.0, more preferably from 1.05:1.00 to about 1.28:1.00, and is most preferably from about 1.10:1.00 to about 1.21:1.00. The ratio of the hose outside diameter to the second nominal inside diameter is preferably from about 1.0:1.0 to about 1.5:1.0, more preferably from about 1.05:1.0 to about 1.3:1.0, and is most preferably from about 1.1:1.0 to about 1.2:1.0. The ratio of the third nominal inside diameter of the band to the second nominal inside diameter of the band is preferably from about 1.05:1.0 to about 2.0:1.0, more preferably from about 1.1:1.0 to about 1.6:1.0, and is most preferably from about 1.2:1.0 to about 1.5:1.0.

Figure 7:
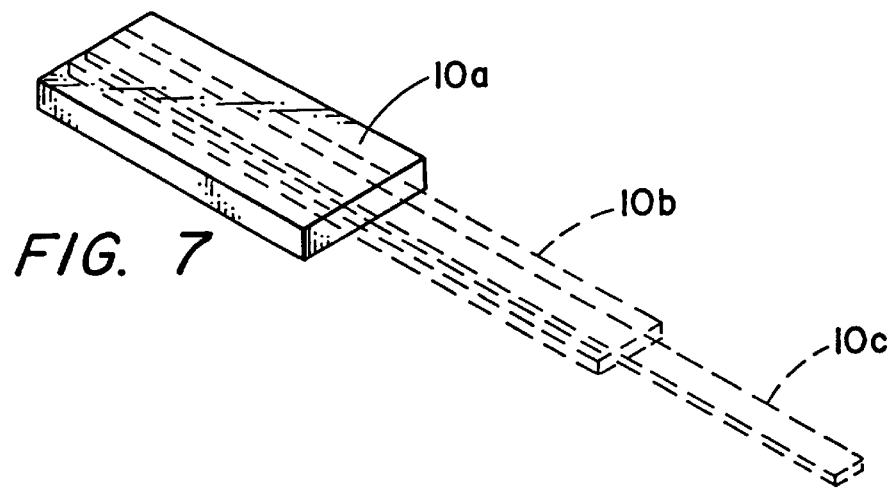
FIG. 7 is a perspective view of another preferred embodiment illustrating the polymer band before and after first and second polymer orientations.
Figure 8:
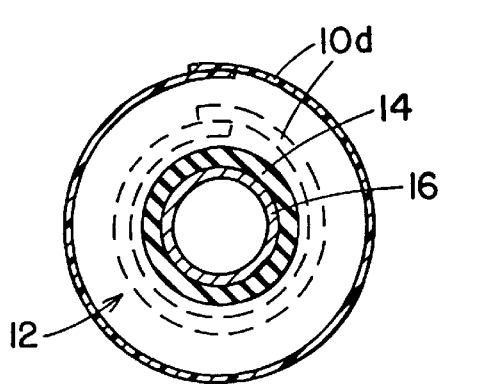
FIG. 8 is an end view of another preferred embodiment illustrating the oriented polymer after initial shrinkage onto the connection end of hose.

Another preferred embodiment of the present invention is depicted in FIG. 7. Here the material of the clamp 10 is formed into a strip 10a. The strip is then stretched at least twice according to the procedure and factors previously described for polymer orientation to new oriented dimensions, 10b, 10c. The at-least-twice-oriented strip 10c is then folded back onto itself to form a band and the overlapped portion is chemically or otherwise welded, as depicted in solid lines for clamp 10d of FIG. 8. The application of the clamp 10d in this embodiment is the same as that for the previous embodiment. However, this embodiment introduces a discontinuity in the clamp 10 at the position where the strip overlaps, giving rise to a less uniform constrictive force than in the embodiment described earlier. Whether this reduction in uniformity provides an opportunity for leakage depends upon the particular clamp application.

The characteristics of the material useful in the practice of the present invention and for the described embodiments are essentially the same. The material, once having been subjected to successive mechanical stretching operations, possesses multiple diameter reducing release characteristics, or responses to multiple diameter reducing release temperatures which result in multiple shrinkage phases. The number of diameter reducing release characteristics is generally equal to the number of mechanical stretching operations the material has undergone. Each of the diameter reducing release characteristics may be preferably preselected for an intended application, within the given range, by selecting the temperature at which the material is maintained during polymer orientation. The temperature so chosen is the setting temperature. The temperature at which the clamp is mechanically expanded will generally but not necessarily be the temperature which will trigger a given shrinkage phase. This characteristic provides the clamp designer sufficient flexibility to design for a variety of different pressure and temperature applications, as well as a variety of conditions to which the clamp will be exposed during transport and storage.

The clamp is formed from a material which preferably tends to shrink substantially every time it is subjected to temperatures at or above each of its respective release temperatures. This characteristic is hereinafter referred to as "tenacious shrinkage". This is in contrast to those heat shrinkable materials which shrink only a few times or even just once to a limit defined by their environment, and then take a set, such that even if heated unrestrained in free space the material is not able to shrink multiple times. Tenacious shrinkage in the material preferred in the present invention occurs as long as the material is not permitted to shrink to a point corresponding to that which would result if the clamp, standing unrestrained in free space, was subjected to temperatures above its release temperatures for a prolonged period. If the clamp were to be subjected to such conditions, it would generally not be able to shrink every time it was exposed to its particular release temperatures. In actual practice however, the clamp is restrained from this type of substantial shrinkage, first by a sturdy restraint, and thereafter by the item being clamped.

The material prepared and formed into a clamp is also preferably characterized by a combination of elasticity and a coefficient of thermal expansion such that the clamp expands under heating conditions and retracts under cooling conditions at a rate near or greater than that of the corresponding expansion and retraction of the materials on which the clamp acts, including the hose and underlying stem.

In the automotive coolant system environment, temperature, pressure and age generally take their toll on hose, stems, inserts and clamps. The clamp is generally required to exhibit repeated thermal contractions and expansions as a result of the cycling of coolant. The more significant effects of pressure and age include flowing or compression of the hose material, whereby the hose walls thin in the proximity of the clamp. The combination of tenacious shrinkage, a coefficient of thermal expansion near or greater than that of the hose material, and good elasticity provide the clamp of the present invention with the ability to self-adjust, i.e., to expand and contract at a rate approaching that of the underlying materials, in those applications where it is subjected to temperatures at or above the preselected release temperatures either continuously or periodically. Assuming adequate dynamic and static hoop stresses, the clamp is able to compensate for the effects of pressure, temperature and age upon the hose and stem due to its self-adjustment characteristic coupled with substantial uniformity of constrictive force and conformability to irregularities in stem and insert shapes. Hot leaks and cold leaks are thus substantially eliminated over the life of the clamp and the associated fluid transport system.

With respect to the at-least-twice-oriented polymer hose clamps of the present invention, dynamic hoop stress is the constrictive force per unit cross-sectional area of the band the clamp exerts upon the clamped object as a result of the inner diameter of the clamp being actively reduced. In this case, this is by the function of the individual shrinkage modes. Static hoop stress is the constrictive force per unit cross-sectional area of the band which the clamp exerts upon the clamped object in countering an expansive force exerted by the clamped object.

For the at-least-twice-oriented polymer hose clamp of the present invention, there exist at least two dynamic hoop stress values and at least two static hoop stress values; one for each shrink mode. The static hoop stresses for the lower temperature shrink mode, i.e., the clamp's first static hoop stress, however exist for a very short period, i.e., only for as long as the higher temperature fluid has not yet flowed through the connection point to trigger the second shrinkage mode. For automotive coolant system applications with stems and inserts of common design, the dynamic hoop stress associated with the initial shrinkage mode, i.e., the clamp's first dynamic hoop stress, is preferably from about 10 to about 3000 psi ($6.89 \times 10^4$ to about $2.07 \times 10^7$ Pa); more preferably from about 100 to about 2000 psi ($6.89 \times 10^5$ to about $1.38 \times 10^7$ Pa); and most preferably from about 500 to about 1500 psi ($3.45 \times 10^6$ to about $1.03 \times 10^7$ Pa), all over the temperature range of −40° C. through 175° C. The dynamic hoop stress associated with the second shrinkage mode, i.e., the clamp's second dynamic hoop stress, is preferably from about 100 to about 4000 psi ($6.89 \times 10^5$ to about $2.76 \times 10^7$ Pa); more preferably from about 800 to about 3500 ($5.52 \times 10^6$ to about $2.41 \times 10^7$ Pa); and most preferably from about 1000 to about 2600 psi ($6.89 \times 10^6$ to about $1.79 \times 10^7$ Pa), all over the temperature range of −40° C. through 175° C. The static hoop stress for this secondary shrinkage mode, i.e., the clamp's second static hoop stress, is preferably from about 100 to about 5000 psi ($6.89 \times 10^5$ to about $3.45 \times 10^7$ Pa); more preferably from about 800 to about 4500 psi ($5.52 \times 10^6$ to about $3.10 \times 10^7$ Pa); and most preferably from about 1000 to about 3600 psi ($6.89 \times 10^6$ to about $2.48 \times 10^7$ Pa), all over the temperature range of −40° C. through 175° C.

It has been surprisingly found that by incorporating at least two diameter reducing characteristics into the clamp via at least two mechanical stretching operations, constrictive forces in terms of dynamic hoop stress reaching magnitudes of about twice that available using heat shrinking polymer clamps of the prior art are now commonly attainable.

In a preferred embodiment of the present invention, the material prepared and formed into a clamp is resistant to the common under hood chemicals, including ethylene glycol, gasoline, motor oil and automatic transmission fluids, Types A and F. Gasoline is defined as ASTM Reference Fuel C in ASTM D471-79. Motor Oil is defined as ASTM Oil No.3 in ASTM D471-79. ASTM D471-79 is incorporated herein by reference. The preferred materials' resistance to these fluids is such that when the material is immersed in ethylene glycol and held at a temperature of 22° C. for seven days, it retains 101 percent of its original tensile strength, 94 percent of its original elongation to break, 86 percent of its original modulus, and swells by less than 1 percent. When immersed in gasoline held at a temperature of 22° C. for seven days, the preferred clamp material retains 93 percent of its original tensile strength, 94 percent of its original elongation to break, 91 percent of its original modulus, and swells by 24 percent. When immersed in gasoline held at a temperature of 70° C. for seven days, the preferred clamp material retains 105 percent of its original tensile strength, 102 percent of its original elongation to break, 92 percent of its original modulus, and swells by 31 percent. When immersed in motor oil held at a temperature of 100° C. for seven days, it retains 104 percent of its original tensile strength, 107 percent of its original elongation to break, 101 percent of its original modulus, and swells by 11 percent. When immersed in automatic transmission fluid Type A held at a temperature of 100° C. for seven days, it retains 109 percent of its original tensile strength, 130 percent of its original elongation to break, and swells by 5 percent. When immersed in automatic transmission fluid Type F held at a temperature of 100° C. for seven days, it retains 104 percent of its original tensile strength, 100 percent of its original elongation to break, and swells by 5 percent.

In a preferred embodiment, the material prepared and formed into a clamp comprises a copolymer and in a more preferred embodiment, comprises a copolyester. One preferred material which meets the preferred characteristics outlined above is marketed by DuPont Chemical under the trademark HYTREL. Two preferred materials are HYTREL TYPE 4056 and HYTREL TYPE 6346. Other materials having similar characteristics and which substantially meet the criteria set forth above are also envisioned.

The at-least-twice-oriented polymer hose clamp of the present invention according to a preferred embodiment is of a relatively flexible material which allows it both to exert a uniform constrictive force and to conform to irregularities in the shape of either the hose or stem. Moreover, the clamp tends to follow the expansions and contractions of the hose material, i.e., it is self-adjusting, as a result of its combination of tenacious shrinkage, elasticity and coefficient of thermal expansion, which reduces the tendency of the hose material to flow from in between the clamp and the stem or insert. This characteristic addresses the short- and long-term effects of pressure, temperature and age upon hose or tubing and stems or other inserts.

The clamp possesses shrinkage responses to each of multiple diameter reducing release temperatures, and in a preferred embodiment, possesses shrinkage responses to each of two diameter reducing release temperatures. In a preferred embodiment, the first release temperature is selected to provide an initial shrinkage mode at room temperature, or from about 0° C. to about 40° C., more preferably from about 10° C. to about 30° C. and most preferably from about 15° C. to about 25° C., which produces sufficient constrictive forces to sustain proper engagement of the clamp to the connection point of the hose assembly. The second release temperature is preferably selected to provide a secondary shrinkage mode at elevated temperatures, of from about 0° C. to about 150° C., more preferably from about 15° C. to about 100° C. and most preferably from about 60° C. to about 85° C., which produces improved constrictive forces in terms of dynamic hoop stress over prior art polymer hose clamps. The net result of these characteristics is to provide an improved clamp which may be applied to the connection ends of hose and stems or other coupling devices without the need for external application of heat to the clamp, and which, once in place and subject to the transfer of higher temperature fluid, exhibits improved constrictive forces in terms of dynamic hoop stress and thus improved resistance to hot and cold leaks.

The clamp of the present invention also provides hoop stresses sufficient to substantially prevent blow-off and pull-off of hoses associated with automotive coolant systems utilizing stems and inserts of prior art design. The clamp is furthermore adequately resistant to the chemicals of the automotive coolant system environment and adequately resistant to corrosion so as to provide service over a substantial lifetime. It is lightweight and devoid of projections that would otherwise waste space, require specific axial and circumferential placement, and provide sources for the collection of debris, or for potential injury. Moreover, the clamp's multiple diameter reducing release temperatures make it fast and easy to apply, as well as readily adaptable to assembly line installation procedures. This combination of characteristics and benefits has heretofore been unavailable in hose clamps, particularly hose clamps designed for automotive coolant system applications.

While the constrictive forces in terms of dynamic hoop stress attainable with the at-least-twice-oriented polymer hose clamp of the present invention generally meet or exceed twice those available using the heat shrinkable polymer hose clamp of the prior art, the specific constrictive force exerted by a particular clamp is dependent upon a host of variables, including the ratio of the second nominal inside diameter to the first nominal inside diameter, the ratio of the first nominal inside diameter to the hose outside diameter, and the storage conditions to which the at-least-twice-oriented polymer clamp is exposed, including temperature and duration. Generally, the higher the ratio of the second nominal inside diameter to the first nominal inside diameter, the greater the constrictive force available in a given clamp at its second diameter reducing release temperature. The higher the ratio of the outer diameter of the hose to the second nominal inside diameter of the clamp, the greater the constrictive force available in a given clamp at its first diameter reducing release temperature. Moreover, if a clamp is maintained at about 20° C. on a rigid restraint for less than six months for example, it will exhibit greater constrictive forces than if it had been maintained at about 50° C. for greater than six months.

The foregoing description and illustrative embodiments of the present invention have been shown in the drawings and described in detail in varying modifications and alternative embodiments. It should be understood however, that the foregoing description of the invention is only to provide examples, and that the scope of the invention is to be limited only by the claims as interpreted in view of the prior art. Moreover, the invention illustratively disclosed herein suitably may be practiced in the absence of any element which is not specifically disclosed herein.

What is claimed is:

1. An improved hose clamp of the type being a polymer type hose clamp adapted to provide a clamping force about a connection end of a hose and to compress said connection end about a stem, the improvement comprising said hose clamp being in the form of an at-least-twice-oriented polymer band having at least a first and a second shrinkage mode, said first shrinkage mode corresponding to a first diameter reducing release temperature, and said second shrinkage mode corresponding to a second diameter reducing release temperature distinct from said first diameter reducing release temperature, said second shrinkage mode tending to urge said hose clamp toward a first nominal inside diameter defining the original inside diameter of said band and being smaller than the outside diameter of said connection end of said hose; and said first shrinkage mode tending to urge said hose clamp toward a second nominal inside diameter distinct from said first nominal inside diameter, said second nominal inside diameter defining the inside diameter of the band after a first polymer orientation and before shrinkage; each of said at least two diameter reducing release temperatures being variably preselected through selection of polymer orientation temperatures such that the first diameter reducing release temperature is within the range of from about –40° C. to about 40° C., and the second diameter reducing release temperature is within the range of from about –40° C. to about 175° C. and each said diameter reducing release temperatures is at least about 5° C. different from any other said diameter reducing release temperature; and wherein said clamp further comprises;

a) a third nominal inside diameter defined as the inside diameter of the band after a second polymer orientation and before shrinkage;

b) a fourth nominal inside diameter defined as the inside diameter of said band upon initial shrinkage about said connection end of said hose; and c) a fifth nominal inside diameter defined as the inside diameter of said band upon secondary shrinkage about said connection end of said hose.

2. The improvement of claim 1 wherein said polymer band shrinks when said polymer reaches each of said diameter reducing release temperatures, toward the nominal inside diameter it possessed prior to each of said polymer orientations, and wherein said polymer exhibits tenacious shrinkage and has a coefficient of thermal expansion so as to cause said band to self-adjust about said connection end.

3. The improvement of claim 1 wherein said hose clamp is of less than two complete overlapping layers.

4. The improvement of claim 1 wherein said clamp is formed from an elastomer.

5. The improvement of claim 4 wherein said elastomer is a copolymer.

6. The device of claim 5 wherein said copolymer is a copolyester.

7. A self-adjusting at-least-twice-oriented polymer hose clamp for providing a clamping force about connection ends of elastomeric hose and stems associated with automotive coolant systems comprising an at-least-twice-oriented polymer in the form of a band, said at-least-twice-oriented polymer having a shrinkage response to each of at least two diameter reducing release temperatures, each of said at least two diameter reducing release temperatures being within the range of from about –40° C. to about 175° C., said band being sized and formed to be radially disposed about said connection end of said hose to urge said hose toward tight and sealing engagement with said stem and to resist axial movement of said hose relative to said stem.

8. The device of claim 7 wherein said at least two diameter reducing release temperatures are variably preselected.

9. The device of claim 8 wherein said release temperature preselection is effected by selecting polymer orientation temperatures.

10. The device of claim 9 wherein each of said diameter reducing release temperatures is variably preselected to be at least 5° C. different from any other diameter reducing release temperature.

11. The device of claim 7, wherein said band further comprises;

a) a first nominal inside diameter defined as the original, pre-orientation inside diameter of said band, said first nominal inside diameter being smaller than the outside diameter of said connection end of said hose;

b) a second nominal inside diameter defined as the inside diameter of the band after a first polymer orientation and before shrinkage;

c) a third nominal inside diameter defined as the inside diameter of the band after a second polymer orientation and before shrinkage;

d) a fourth nominal inside diameter defined as the inside diameter of said band upon initial shrinkage about said connection end of said hose;

e) a fifth nominal inside diameter defined as the inside diameter of said band upon secondary shrinkage about said connection end of said hose;

and wherein said polymer band shrinks when said polymer reaches each of said diameter reducing release temperatures toward the nominal inside diameter it possessed prior to each of said polymer orientations, and wherein said at-least-twice-oriented polymer exhibits tenacious shrinkage and has a coefficient of thermal expansion so as to cause said band to self-adjust about said connection end.

12. The device of claim 7, wherein said band has a first diameter reducing release temperature within the range of from about 0° C. to about 40° C.

13. The device of claim 7, wherein said band has a first diameter reducing release temperature within the range of from about 10° C. to about 30° C.

14. The device of claim 7, wherein said band has a second diameter reducing release temperature within the range of from about 0° C. to about 150° C.

15. The device of claim 7, wherein said band has a second diameter reducing release temperature within the range of from about 15° C. to about 100° C.

16. The device of claim 7, wherein said clamp constricts to produce a first dynamic hoop stress of from about 10 to about 3000 psi (about $6.89 \times 10^4$ to about $2.07 \times 10^7$ Pa) over the temperature range of from about −40° C. through about 175° C.

17. The device of claim 7, wherein said clamp constricts to produce a first dynamic hoop stress of from about 100 to about 2000 psi (about $6.89 \times 10^5$ to about $1.38 \times 10^7$ Pa) over the temperature range of from about −40° C. through about 175° C.

18. The device of claim 7, wherein said clamp constricts to produce a second dynamic hoop stress of from about 100 to about 4000 psi (about $6.89 \times 10^5$ to about $2.76 \times 10^7$ Pa) over the temperature range of from about −40° C. through about 175° C.

19. The device of claim 7, wherein said clamp constricts to produce a second dynamic hoop stress of from about 800 to about 3500 psi (about $5.52 \times 10^6$ to about $2.41 \times 10^7$ Pa) over the temperature range of about −40° C. through about 175° C.

20. The device of claim 7, wherein said clamp constricts to produce a second static hoop stress of from about 100 to about 5000 psi (about $6.89 \times 10^5$ to about $3.45 \times 10^7$ Pa) over the temperature range of −40° C. through about 175° C.

21. The device of claim 7, wherein said clamp constricts to produce a static hoop stress of from about 800 to about 4500 psi (about $5.52 \times 10^6$ to about $3.10 \times 10^7$ Pa) over the temperature range of about −40° C. through about 175° C.

22. An elastomeric hose, stem and hose clamp assembly comprising:
   a) an elastomeric hose having a connection end;
   b) a stem inserted within said connection end;
   c) a hose clamp mounted upon said hose at said connection end, said clamp being formed from an at-least-twice-oriented polymer having a shrinkage response to each of at least two diameter reducing release temperatures, said clamp being sized and formed to be radially disposed about said connection end of said hose to urge said hose toward tight and sealing engagement with said stem and to resist axial movement of said hose relative to said stem.

23. The assembly of claim 22, wherein said at-least-twice-oriented polymer exhibits tenacious shrinkage and has a coefficient of thermal expansion as to cause said clamp to self-adjust about said connection end.

24. A hose clamp and restraint assembly comprising:
   a) a substantially circular restraint; and
   b) the clamp of claim 1 mounted upon said restraint.

25. A method for producing a hose clamp comprising the steps of:
   a) forming a band having a first nominal inside diameter;
   b) mechanically expanding said band a first time at temperatures of from about 0° C. to about 150° C. to a second nominal inside diameter, wherein the ratio of said second nominal inside diameter to said first nominal inside diameter is from about 1.5:1.0 to about 5.0:1.0;
   c) mechanically expanding said band a second time at temperatures of from about 0° C. to about 40° C. to a third nominal inside diameter, wherein the ratio of said third nominal inside diameter to said first nominal inside diameter is from about 3.0:1.0 to about 6.0:1.0; and
   d) placing said band on a circular restraint.

26. The method of claim 25 further comprising the step of chilling said assembly at from about 15° C. to about −40° C. prior to said mechanically expanding said band a second time.

27. A method for securing a hose clamp to a connection point of a hose end and a stem, comprising the steps of:
   a) placing said clamp about said hose end;
   b) placing said hose end about said stem to form a connection;
   c) at a temperature at least equal to a first diameter reducing release temperature of said clamp, allowing said clamp to shrink a first time about said hose end toward a first diameter to form an initial seal;
   d) allowing transfer medium to flow through said connection, said medium having a temperature at least equal to a second diameter reducing release temperature of said clamp; and,
   c) allowing said clamp to attain a temperature at least equal to said second diameter reducing release temperature causing said clamp to tend to shrink a second time about said hose end toward a second diameter distinct from said first diameter.

28. The method of claim 27 further comprising the step of chilling said hose clamp to a temperature of from about 0° C. to about −60° C. prior to placing said clamp about said hose end.

29. The method of claim 27 wherein said first diameter reducing release temperature is within the range of from about −40° C. to about 40° C., and said second diameter reducing release temperature is within the range of from about −40° C. to about 175° C.

30. An improved method of forming a hose clamp of the type having the steps of extruding a polymer to form a band having a first nominal inside diameter, adjusting the temperature of said band to a first setting temperature, mechanically expanding said band to a second nominal inside diameter, the improvement comprising the steps of:
   a) adjusting the temperature of said band to a second setting temperature; and
   b) mechanically expanding said band to a third nominal inside diameter.

31. The improvement of claim 30 further comprising said first setting temperature being within the range of about 0° C. to about 150° C.

32. The improvement of claim 30 further comprising said second setting temperature being within the range of about 0° C. to about 40° C.

33. The improvement of claim 30 further comprising said first setting temperature and said second setting temperature being greater than about 5° C. apart.

34. The improvement of claim 30 further comprising the ratio of said second nominal inside diameter to said first nominal inside diameter being from about 1.5:1.0 to about 5.0:1.0 and the ratio of said third nominal inside diameter to said first nominal inside diameter being from about 3.0:1.0 to 6.0:1.0.

* * * * *